Aug. 11, 1959     J. R. YOUNG     2,899,043
AUTOMATIC MATERIAL HANDLING DEVICES
Filed March 8, 1955     6 Sheets-Sheet 1
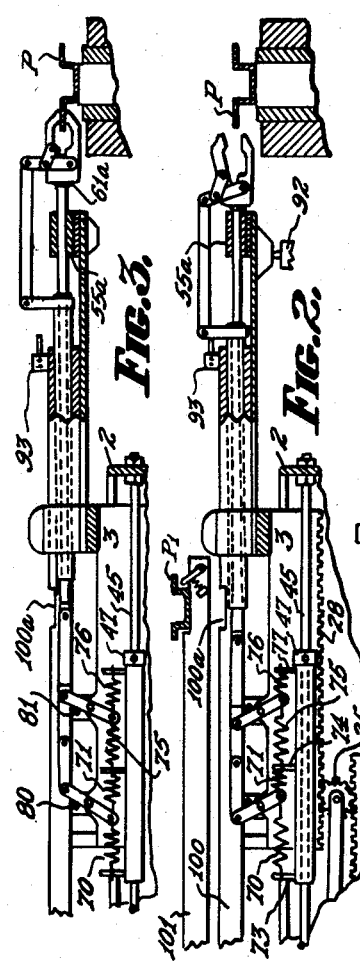
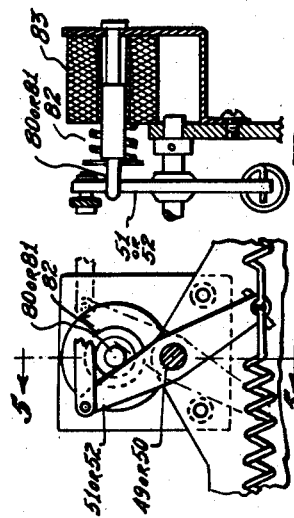
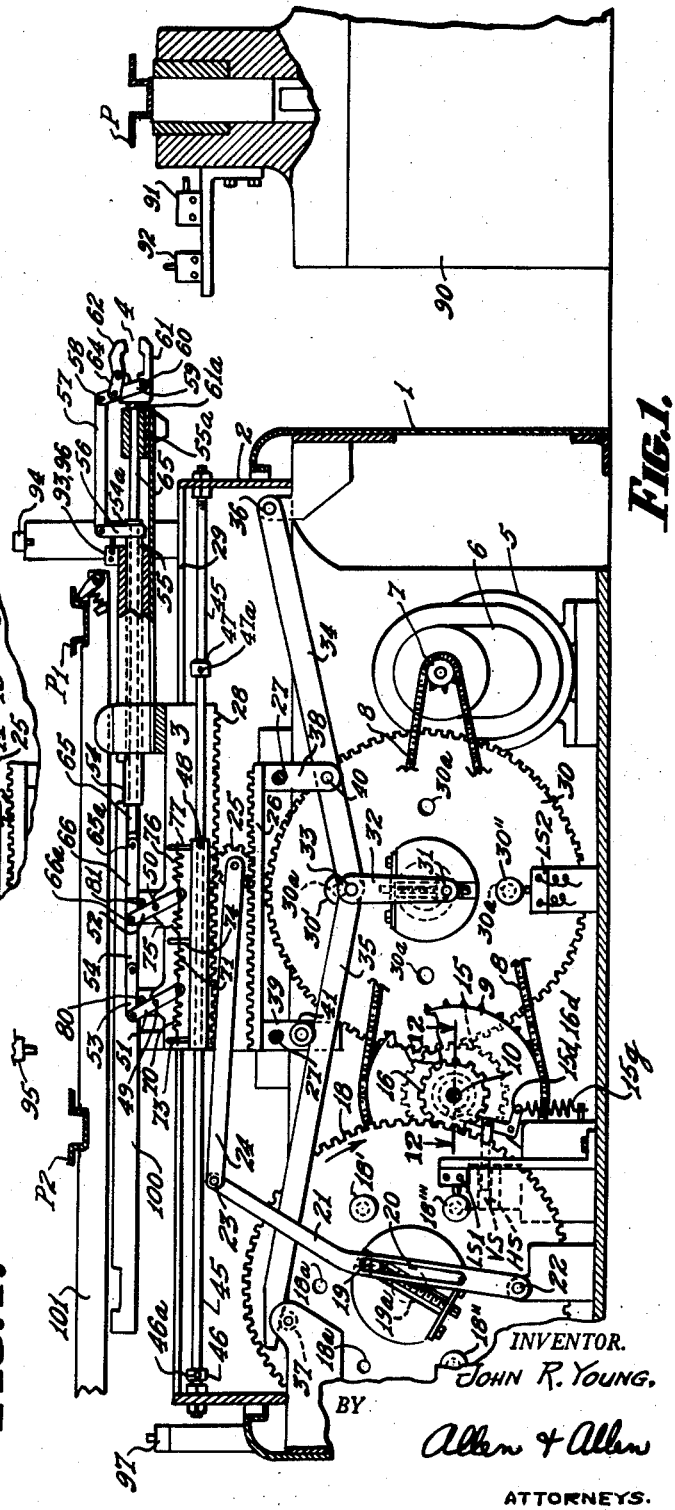
INVENTOR.
JOHN R. YOUNG.
BY
Allen & Allen
ATTORNEYS.

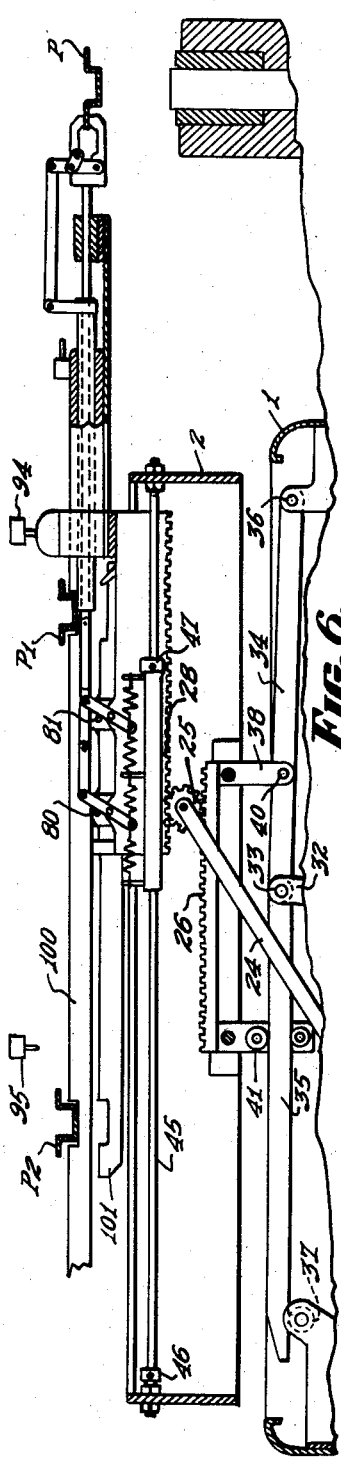

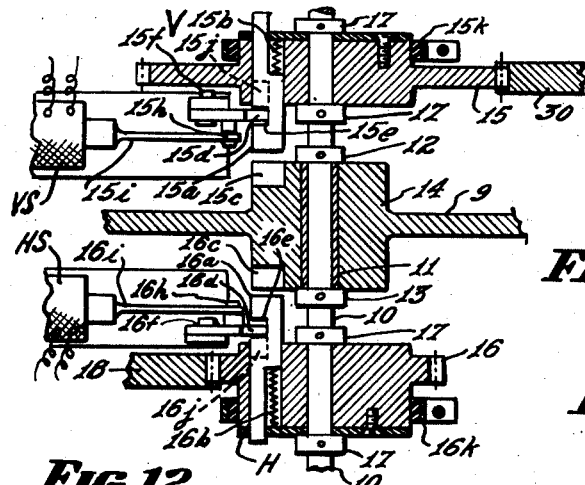
FIG.12.
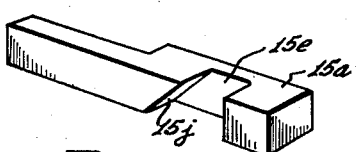
FIG.13.
FIG.14.
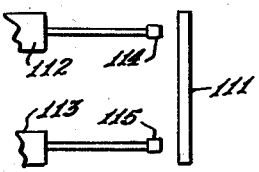
FIG.15.
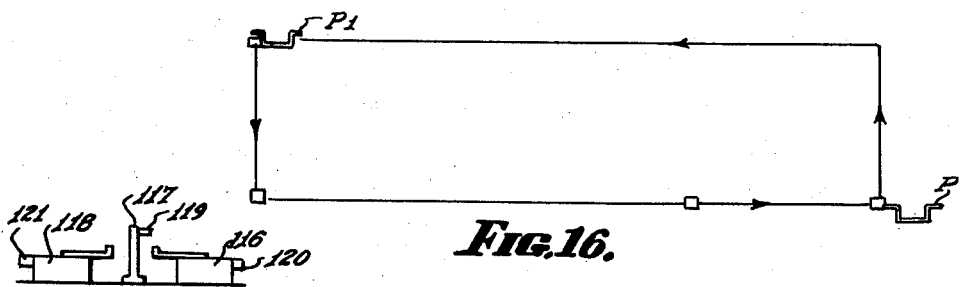
FIG.16.
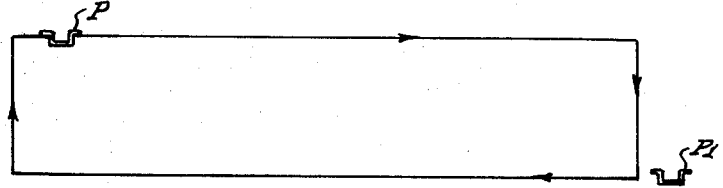
FIG.22.   FIG.17.
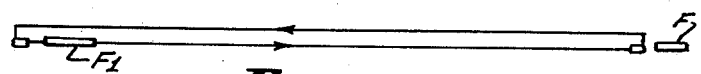
FIG.18.
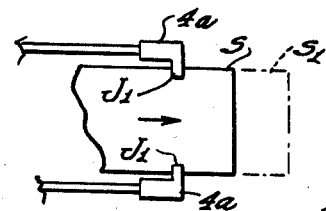
FIG.20.
FIG.19.
FIG.21.
INVENTOR.
JOHN R. YOUNG,
BY
Allen + Allen
ATTORNEYS.

Aug. 11, 1959
J. R. YOUNG
2,899,043
AUTOMATIC MATERIAL HANDLING DEVICES
Filed March 8, 1955
6 Sheets-Sheet 4
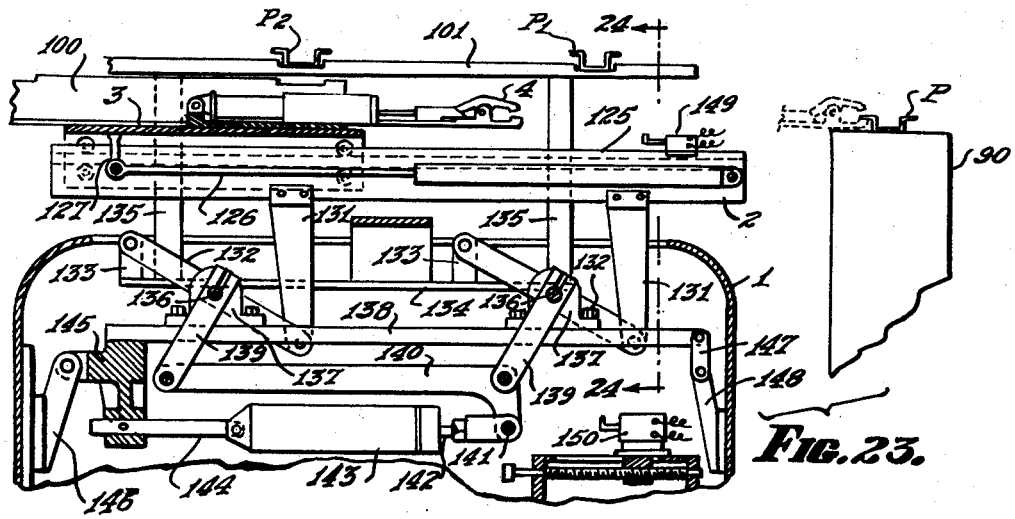
FIG. 23.
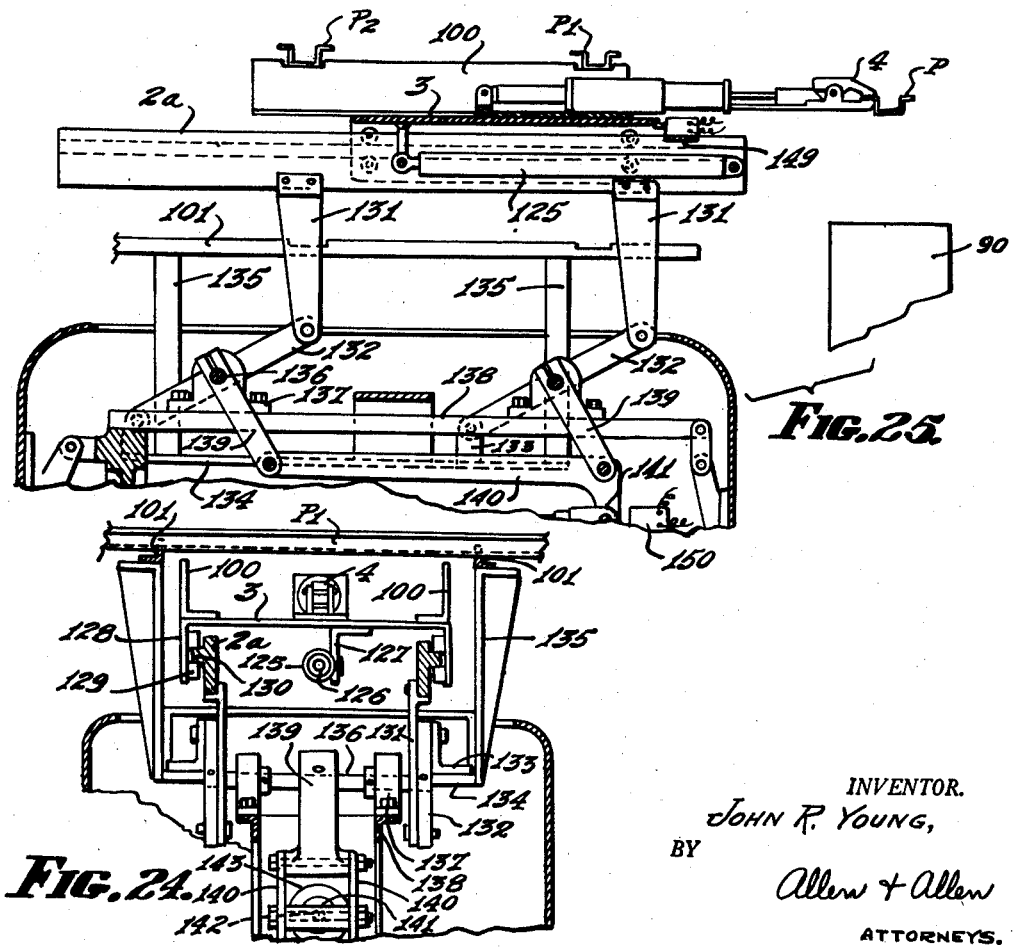
FIG. 25.
FIG. 24.
INVENTOR.
JOHN R. YOUNG,
BY
Allen & Allen
ATTORNEYS.

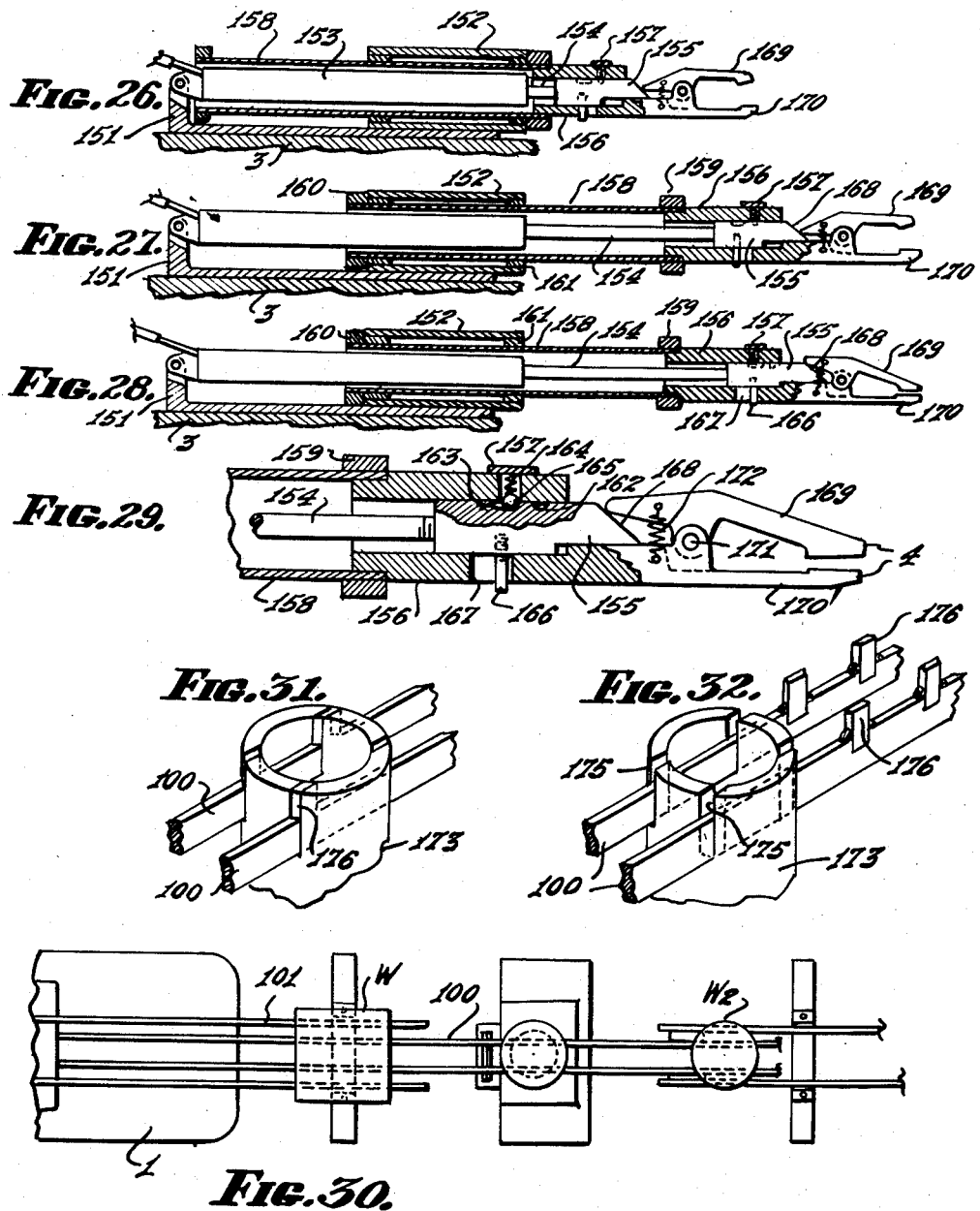

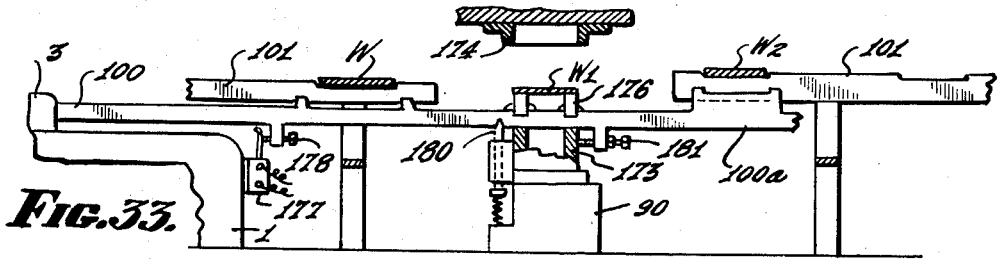
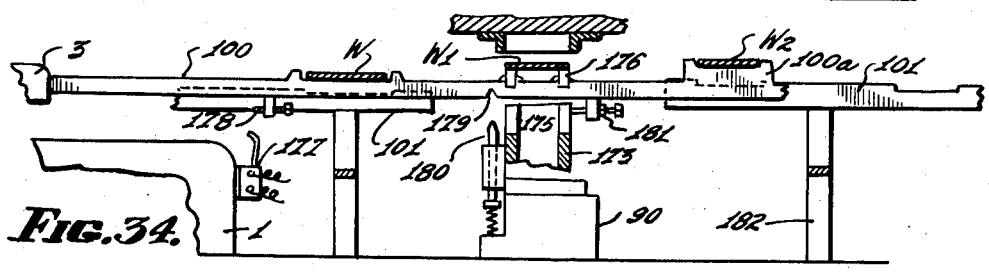
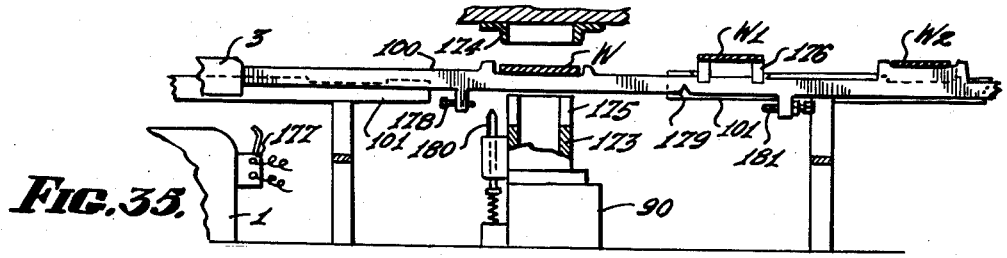
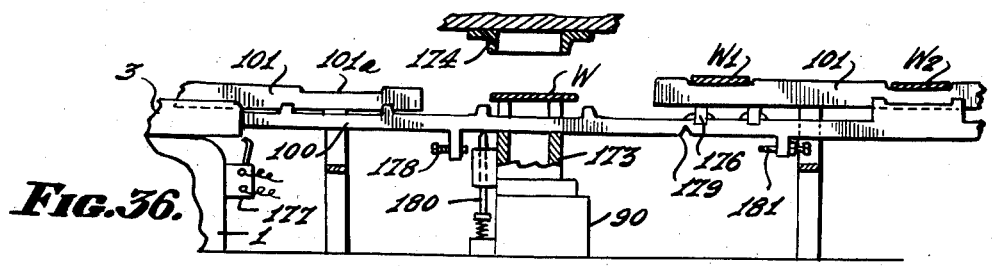

United States Patent Office 2,899,043
Patented Aug. 11, 1959

2,899,043

AUTOMATIC MATERIAL HANDLING DEVICES

John R. Young, Hamilton, Ohio

Application March 8, 1955, Serial No. 492,972

21 Claims. (Cl. 198—219)

This invention relates to mechanisms and machines for automatically transferring work pieces to or from other industrial machines such as punch presses, welding machines and the like.

More specifically this invention relates to improvements in mechanisms and machines of a class often referred to as slave machines. The purpose of the slave machine is to serve another machine, commonly referred to as the master machine, in accordance with the requirements thereof, actuation of the slave machine being initiated by the master machine. Upon completion of its service cycle the slave machine remains inactive until another cycle of operations is initiated by the master machine.

An important object of this invention is to provide an improved mechanism for use with a punch press or other industrial machine whereby at the conclusion of a work cycle thereof the device of this invention will automatically remove and transfer the finished work piece from the machine to a receiving station.

Another object of this invention is to provide improved devices of the above character in which the mechanism is so arranged that the function thereof may be reversed, in this manner permitting the device of this invention to serve as a feeding mechanism which will automatically insert a new work piece after removal of each finished work piece.

In the drawings, wherein like numerals are employed to designate like parts throughout, Figure 1 is a semi-diagrammatic side elevational view illustrating a preferred embodiment of the invention, parts of the view being in section and other parts being broken away or omitted to facilitate illustration of the pertinent features, the view also including a fragmentary and partial section of a master machine such as a punch press or welding machine.

Figures 2 and 3 are fragmentary semi-diagrammatic views illustrating successive positions of the mechanism.

Figure 4 is an enlarged fragmentary view showing a fulcrumed lever comprising means for actuating clamping jaws.

Figure 5 is a sectional view taken along the lines 5—5 of Figure 4 and illustrating a solenoid actuated latch pin employed in conjunction with the lever of Figure 4.

Figures 6, 7, 8 and 9 are semi-diagrammatic views showing further successive positions of the mechanism.

Figure 10 is a side elevational view of a pair of clamping jaws.

Figure 11 is a side elevational view of a spring biased latch lever.

Figure 12 is an enlarged fragmentary section view taken along the line 12—12 of Figure 1 and illustrating a pair of solenoid actuated clutches of the type employing sliding keys.

Figure 13 is a perspective view of one of the sliding keys.

Figure 14 is a diagrammatic plan view illustrating a single mechanism of the invention as employed for transferring smaller work pieces.

Figure 15 is a diagrammatic plan view similar to Figure 14 but illustrating a pair of the mechanisms as preferably employed for transferring long work pieces.

Figures 16, 17, 18, 19 and 20 are diagrammatic views illustrating various alternate uses and positions of the mechanism.

Figure 21 is a perspective view illustrating a modified clamp structure employed for use with strip materials.

Figure 22 is a side elevation and diagrammatic view illustrating the use of two mechanisms, one to supply work pieces and one to remove them.

Figure 23 is a semi-diagrammatic sectional view of an alternative embodiment of my invention differing principally in the use of pneumatic means to operate various of the parts, certain other variations in the structure also occurring.

Figure 24 is a section taken on the line 24—24 of Figure 23.

Figure 25 is a view similar to that of Figure 23 but showing an alternate position of the parts as occurs in the operation of the machine.

Figure 26 is an enlarged sectional view of the gripping mechanism employed in the embodiment of Figure 23.

Figure 27 is a view similar to Figure 26 but showing an alternate position of the operating parts.

Figure 28 is a figure similar to those of Figures 26 and 27 but showing a still further position of the operating parts.

Figure 29 is an enlarged sectional view of a portion of the gripping mechanism of Figures 26 and 28.

Figure 30 is a diagrammatic plan view showing relative position of certain of the more important parts of the embodiment of Figure 23.

Figure 31 is an enlarged perspective view of a die member and certain cooperating structure of the embodiment of Figure 23.

Figure 32 is a perspective view showing another position of the parts illustrated in Figure 31.

Figures 33 through 36 are semi-diagrammatic sectional views illustrating a sequence of positions assumed by the various operating parts making up the alternative embodiment generally shown in Figure 23.

*Brief general description of the machine*

Referring particularly to Figure 1, and as will later be described more fully in detail, the improved mechansim briefly comprises a stationary main frame 1 having an auxiliary frame 2 which auxiliary frame is suitably arranged to be raised (and thereafter lowered) vertically with respect to the main frame.

Slidably mounted within the auxiliary frame 2 is a carriage 3 having forwardly extending clamping jaws 4. The carriage 3 is arranged for horizontal reciprocating movement, the jaws 4 being designed for closing and opening movements by reason of which they may engage and later disengage work pieces in a predetermined sequence. By this arrangement the carriage 3 with its jaws 4 may move back and forth and also, with the frame 2, up and down. Thus, proper horizontal and vertical manipulation of the auxiliary frame and carriage, along with proper actuation of the jaws as will be described, enable work pieces to be transferred from one point to another.

*Driving arrangement*

Still referring to Figure 1 a motor 5, acting through reduction gearing contained within the casing 6 drives a sprocket 7 which in turn drives a chain 8 and sprocket 9. Referring now also to Figure 12 the sprocket 9 is rotatably journaled on a shaft 10, the sprocket being provided with a suitable bearing bushing 11 while collars 12 and 13, pinned to the shaft 10, engage the hub 14 of the sprocket to prevent axial displacement of the sprocket 9 on the shaft 10.

When the machine of this invention is in operation the sprocket 9 is driven continuously. Driving power for a train of mechanism, later to be more fully described, to produce horizontal reciprocation of the carriage 3 is derived from the sprocket 9 by means of a solenoid operated clutch generally indicated at H. This clutch, when actuated, engages the hub 14 of the sprocket 9. Likewise, the driving power for a second train of mechanism, also to be described in greater detail shortly, by which the auxiliary frame 2 is raised or lowered, is also derived from the sprocket 9 by a second solenoid operated clutch V. This clutch, when actuated, also engages the hub 14.

*The solenoid actuated automatic clutches*

Also rotatably mounted or journalled upon the shaft 10, as best seen in Figure 12, are spur gears 15 and 16 which are arranged on opposite sides of the sprocket 9, the gears being retained in axial position on the shaft by means of the various collars indicated at 17. The gears 15 and 16 comprise the solenoid actuated clutches H and V hereinbefore mentioned. These clutches are an automatic type which employ sliding keys as well known in the art. To this end the hubs of the gears 15 and 16 are suitably formed to accommodate slidable keys respectively indicated at 15a and 16a, these keys being urged by springs 15b and 16b towards entry into notches 15c and 16c formed in the hub 14 of the constantly rotating sprocket 9.

The slidable keys just mentioned, however, are restrained from moving into engagement with the notches by the presence of trip levers 15d and 16d, the upper ends of which levers engage notches 15e and 16e of the keys. The lower ends of the trip levers are pivotally mounted on the frame as indicated at 15f and 16f. Referring briefly to Figure 1 it will be observed that the trip levers 15d and 16d actually comprise bell cranks the shorter arms of which are each engaged by a spring as indicated at 15g. This spring urges the levers to the position shown wherein the slidable keys are restrained from moving in to driving engagement with the notches of the hub 14.

Referring again to Figure 12 the trip levers 15d and 16d are pivotally affixed as at 15h and 16h to plungers 15i and 16i of solenoids respectively indicated at VS and HS. As will now be clear, when the solenoid VS is energized the trip lever 15d is retracted from the slot of the sliding key 15a. This permits the spring 15b to push or shift the key into the notch 15c of the hub 14. In this manner the gear 15 is engaged or clutched to the sprocket 9 and rotates therewith until the sliding key is withdrawn from the notch. Likewise when the solenoid HS is energized the sliding key 16a is permitted to enter the notch 16c and the gear 16 is clutched to the sprocket 9 to rotate therewith until the key is withdrawn from the notch.

Declutching of the gears 15 and 16 occurs upon deenergization respectively of the solenoids VS and HS which action permits the spring biased trip levers to spring back into the rotating path of movement of the sliding keys. Referring briefly to Figure 13 it will be observed that the slot 15e of the key 15a comprises a cam surface 15j and as this cam surface engages the upper end of the trip lever 15d the key 15a will be withdrawn from driving engagement with the rotating hub 14. The gear 15 promptly comes to rest upon withdrawal of the key. A friction band or breaking device as indicated at 15k preferably is employed to engage the hub of the gear and insure this prompt arrest. Likewise it will be clear that declutching of the gear 16 occurs when the solenoid HS is deenergized, the sliding key 16a being provided with a cam surface 16j and a friction band 16k similar to those just described.

As will later be more fully clear, in some instances the gears 15 and 16 are declutched at the conclusion of a single revolution, while in other instances the gears are permitted to complete two, and sometimes three, revolutions before being declutched from driving engagement with the sprocket 9.

*Mechanism for shifting the carriage horizontally*

Referring again to Figure 1 the gear 16, driven by energizing the solenoid HS in the manner just explained drives a larger gear 18 which carries a crank pin 19. The pin 19 engages a slot 20 in a rocking lever 21 which is pivotally affixed to the frame as at 22. Also pivotally affixed as at 23 to the rocking lever is a bar or link 24 which mounts a pinion 25 engaging a lower rack 26 affixed as by bolts or the like 27 to the auxiliary frame 22. The pinion also engages an upper rack 28 affixed to the carriage 3. From the arrangement just described it will be clear that movement of the rocking lever 21 results in horizontal movement of the carriage 3, the carriage being slidably mounted upon rails 29 fixed in the auxiliary frame 2. It will also be clear that the horizontal movements of the carriage will be initiated and terminated respectively by energizing or deenergizing the solenoid HS. The distance the carriage moves is determined by the number of revolutions imparted to the gear 16 during its clutched engagement to the sprocket 9.

In the embodiment shown the ratio of the gears 16 and 18 is 6 to 1. Thus six revolutions of the gear 16 are required to produce one full revolution of the gear 18 in order to move the carriage forward and backward through a full cycle of its sliding movement within the frame 2. It is desirable for the carriage to be moved through its cycle of operations in intermittent fashion. For this purpose the large gear 18 is provided with six equally spaced holes 18a, the circumferential distance between successive holes being equal to that amount of movement produced by one revolution of the gear 16. Plugs or pins such as those indicated at 18', 18" and 18''' are removably fitted within the holes. These pins may be placed as required to actuate a limit switch or the like LS1 which serves to deenergize the solenoid HS and thus terminate horizontal movement of the carriage in desired positions.

*Mechanism for shifting the carriage vertically*

The gear 15 (driven by energizing the solenoid VS) drives a larger gear 30 having a crank pin 31 which engages a pitman arm 32 which itself is pivotally attached as at 33 to links 34 and 35, the link 34 being pivotally affixed at 36 to the main frame and the link 35 at its outer end resting on a roller 37 carried on the main frame.

Fixed to the auxiliary frame 2 as by the fastening means 27 and extending downwardly therefrom are members or legs 38 and 39. The leg 38 is pivotally affixed as at 40 to the link 34 and the leg 39 has a roller 41 resting on and engaging the link 35.

From an examination of the drawings it is apparent that as the pitman arm 32 is lifted upwardly by rotation of the pin 31, the links 34 and 35 will also be lifted upwardly about their pivotal mountings on the frame. Consequently the auxiliary frame 2 and the carriage 3 will also be raised. Conversely it will be apparent that as the pin 31 travels in a downward path the frame 2 and the carriage 3 will be lowered. The vertical movement is initiated and terminated respectively by energizing and deenergizing the solenoid VS.

In the embodiment shown the ratio of the gears 15 and 30 is 4 to 1. Thus four revolutions of the gear 15 are required to produce one full revolution of the gear 30 in order to move the carriage up and down through one full cycle of its vertical movement. It is desirable, however, that the vertical movement of the carriage should be accomplished in an intermittent fashion. For this purpose the larger gear 30 is provided with four equally spaced holes 30a the circumferential distance between successive holes being equal to that amount of movement produced by one revolution of the gear 15. Plugs or pins such as those indicated at 30' and 30" are fitted within the holes and placed as required to actuate a limit switch or the like LS2, which serve to deenergize the solenoid VS and terminate vertical movement of the carriage as desired.

Arrangement of the clamping jaws

Fixably mounted within the frame 2 is a rod 45 having collars 46 and 47 which are fixed in position by means of screws or pins 46a and 47a. Slidably mounted on the rod 45 is a member 48 which slides between the collars 46 and 47. Fulcrumed in the carriage 3 as at 49 and 50 are levers 51 and 52. These levers serve to actuate the jaws 4 through means next to be described.

At its upper end the lever 51 is pivotally fastened to a short link 53 which in turn is pivotally fastened to a member 54. The member 54 comprises a tube slidably mounted within a forward extension 55 of the carriage 3. Fixed to the forward end of the tube is a bracket 56 which is pivotally fastened to a link 57. The link 57 is pivotally fastened as at 58 to a lever 59 and the lower end of this lever is pivotally mounted as at 60 to a jaw member 61.

As perhaps best seen in Figure 10 the member 61 comprises an element of the clamping jaws, a coacting upper jaw 62 pivotally mounted as at 63 also being employed. A short link 64 is pivotally fastened at 64a to the jaw 62 and at 64b to the lever 59.

As will be apparent from an examination of Figure 10, clockwise rotation of the lever 59 about its pivot 60 results in the lever 64 swinging the jaw 62 about its pivotal mounting 63 until the jaws 61 and 62 are in closed position or until a work piece has been engaged therebetween.

Referring again to Figure 1 it will now be evident that the operation of closing and opening the jaws may be controlled by a suitable manipulation of the lever 51 to actuate the train of mechanisms just described. Such manipulation will be described presently.

The lower clamp jaw 61 is fixedly mounted as by welding at 61a to a rod 65 which rod is slidably mounted in a forwardly extending portion 55a of the carriage 3. The rod 65 extends through and slidably fits within the tube 54. The rod 65 is pivotally affixed at 65a to the lever 52. It will now be clear that by manipulation of the lever 52 the jaws 4 may be advanced a short distance forward i.e., to the right with respect to the carriage and the position shown in Figure 1.

Means for actuating the clamping jaws

As best seen in Figures 1, 4 and 5 the lever 51 at its lower end is engaged by oppositely disposed springs 70 and 71 which are respectively attached at their outer ends to pins 73 and 74 fixed in the member 48. In the arrangement of parts as seen in Figure 1 the springs 70 and 71 are in equilibrium and no tendency prevails to cause movement of either the lever 51 or the sliding member 48 which the springs engage through the pins 73 and 74.

Likewise the lower end of the lever 52 is engaged by oppositely disposed springs 75 and 76 which are respectively attached at their outer ends to the pin 74 and a pin 77 fixed in the member 48. The springs 75 and 76 are also in equilibrium and in the position of Figure 1 no tendency prevails to cause movement of the associated parts.

Referring still to Figures 1, 4 and 5, it is to be noted that clockwise movement of the levers 51 and 52 about their fulcrums 49 and 50 is prevented by the presence of latch pins 80 and 81. As perhaps best seen in Figure 5 these latch pins are resiliently urged to the position shown by means of compression springs such as the spring 82. Each of the latch pins includes a solenoid 83 by means of which the latch pins may be retracted from the position shown to permit movement of the levers 51 and 52 in clockwise rotation with respect to the position shown in Figures 1 and 4. Thus, as best seen in Figures 4 and 5, if the latch pin 80 (or 81) is retracted by momentary energization of the solenoid 83 the lever 51 (or 52) may pivot clockwise to the position indicated by broken lines whereafter the latch pin by reason of the spring 82 will again return to position, locking the lever from counterclockwise movement. In this manner during operation of the machine the levers 51 and 52 are alternately locked against clockwise and counterclockwise movement. Elaboration on the description of this mechanism follows.

As seen in Figure 2 the carriage 3 has been shifted to its extreme right hand position within the frame 2, the sliding member 48 moving therewith due to its connection with the carriage through the springs 70, 71, 75 and 76. Before arrival of the carriage at this extreme right hand position, however, the movement of the sliding member 48 is halted by reason of the collar 47. By halting movement of the member 48 while the carriage continues its movement to the right, a stretching or tensioning of the springs 70 and 75 is affected. This position of the parts is clearly seen in Figure 2 and it will now be apparent that by retracting the latch pins 80 and 81 (as occurs upon energization of the solenoids 83) the tension springs 70 and 75 will immediately function to shift or snap the levers 51 and 52 to the position of Figure 3 where the jaws 4 have moved forward a small amount and also have closed to engage a work piece P.

Referring to Figure 3 it is to be noted that the jaw actuating springs 70, 71, 75 and 76 are again in positions of equilibrium. It is also to be noted that the latch pins 80 and 81 are now positioned to prevent counterclockwise movement of the levers, thus retaining the jaws 4 in closed position. In such closed position of the parts the carriage 3 may be shifted to its extreme left hand position within the frame 2. This arrangement of the mechanism is shown in Figure 7 where it will be observed that movement of the sliding member 48 has been halted by the collar 46 to stretch or tension the springs 71 and 76 as the carriage continues to the position shown. If the latch pins 80 and 81 are now retracted the springs 71 and 76 will snap the levers 51 and 52 to the position of Figure 8 where the jaws 4 have been opened to release the work piece P and also have been retracted a short distance from the work piece. From this it will be clear that as the carriage 3 is shifted from side to side the arrangement described functions alternately upon actuation of the solenoids 83 to close and open the clamp jaws.

Operation of the mechanism to remove work pieces from the machine

Referring again to Figure 1, a machine such as a punch press is indicated at 90. As well known in the art the particular machine may include a switch 91 which is actuated at the conclusion of a work cycle. Hence the switch 91 may be employed to initiate movements of the carriage 3 whereafter further movement of the carriage and actuation of the clamping jaws may be controlled by various other switches. In Figure 1, I have indicated these other switches at 92 through 97. These switches coact with other mechanisms previously described to control movement of the carriage and jaws.

Upon actuation of the switch 91 the solenoid HS is energized. As previously explained this engages the clutch H to initiate horizontal movement of the carriage. With respect to Figure 1 the carriage moves to the right until the pin 18' carried in gear 18 strikes the limit switch LS1 to disengage the clutch and halt forward movement of the carriage. This position of parts occurs as the carriage arrives at the position of Figure 2 wherein the jaws are in position preparatory to engaging the work piece P and wherein another switch 92 is contacted at this time. Actuation of the switch 92 energizes, in known manner, the solenoids 83 to actuate the jaws 4 which, due to the spring tensioning provisions of the member 48 as above explained, then snap to the position of Figure 3 to engage the work piece P. As the jaws snap to closed position the switch 93 is actuated to engage the clutch V and initiate upward vertical movement of the carriage. This upward movement continues until the pin 30' carried in gear 30 strikes the limit switch LS2 to break the circuit and halt further upward movement of the carriage, such upper limit being the position shown in Figure 6. As the carriage arrives at this latter position a switch 94 is actuated which again actuates the clutch H to initiate movement of the carriage to the left, this movement being terminated as the parts arrive at the position of Figure 7 by reason of the pin 18" striking the limit switch LS1 to disengage the clutch H. As the parts arrive at the position of Figure 7 a switch 95 is contacted which energizes the solenoids 83 to retract the latch pins 80 and 81 whereupon the jaws snap back to the open position of Figure 8. As the jaws snap to the open position just mentioned a switch 96 is actuated to again engage the clutch V, this time initiating downward movement of the carriage which latter movement continues until the pin 30" carried in gear 30 strikes the limit switch LS2 to terminate such downward movement with the parts in the position of Figure 9. As the parts arrive at this last mentioned position a switch 96 is actuated to again engage the clutch H and initiate horizontal forward movement of the carriage, the forward movement being halted when the pin 18''' carried in the gear 18 strikes the limit switch LS1. Upon this happening the mechanism is stopped in the position of Figure 1. This completes a full cycle of operation and the mechanism rests until the switch 91 is again actuated to initiate a new cycle of operation.

It will now be clear that by the movements illustrated in Figures 3 through 8 the work piece P will be transferred from the punch press 90 to the position indicated at P1. Simultaneously with this a work piece P1 will be transferred to the position P2 by reason of the notched bar 100 fixedly mounted on the carriage, the work pieces P1 and P2 resting during transit period on a bar 101 fixedly mounted and positioned above the carriage as clearly shown in Figure 1. The arrangement of the bars 100 and 101, and their relationship to the mechanisms previously described, will be described more fully as follows.

It will be understood that there may be one or more of the bars 100 and also of the bars 101. The bar 100 moves with the carriage while the bar 101 is fixed independently of the carriage and to this end may be fastened in the main frame 1 or otherwise supported from the building floor.

In operation, the machine first moves from the position of Figure 1 to that of Figure 2. This constitutes a horizontal movement of the carriage 3 and bar 100. At this time it will be noted that the bar 100 is beneath the level of the bar 101 and that there is a notch 100a which has been brought directly under a work piece P1 presently supported on the bar 101.

After the mechanism has reached the position of Figure 2 then, as above generally described, the jaw members are actuated to grip the work piece P as shown in Figure 3. Following this the carriage 3 and bar 100 are raised vertically. As this happens the piece P1 which formerly rested on the bar 101 is engaged by the notch 100a of the bar 100 and moved upwardly along with the bar 100 to a position above the fixed bar 101. As seen in Figure 6 the work piece P has thus been raised and the work piece P1 has been thus transferred from the bar 101 to the bar 100.

Next the carriage and bar 100 move to the position shown in Figure 7. The work piece P1 of Figure 6 is now in the position of P2 in Figure 7. The work piece P is still gripped by the jaws. The carriage and bar 100 are still in their upper position. Following this, as shown in Figure 8, the jaws release and withdraw slightly from the work piece P which is now in the position of P1.

Finally, as shown in Figure 9, the carriage 3 and the bar 100 move downwardly to their original positions. When this happens the work piece P1 which had been moved from the position of P1 in Figure 6 to that of P2 in Figures 7 and 8, in which figures it was still supported on the bar 100, is now supported on the bar 101. Lowering of the carriage 3 and bar 100 resulted in the work piece shown in the position P2 being brought to rest on the bar 101. Thus in this cycle of operations the work piece P was moved from the machine 90 to the position of P1 on the bar 101 while at the same time the work piece in the position of P1 on the bar 101 was moved to the position of work piece P2 on the bar 101. It will be obvious that another cycle of operations will move each work piece backward from the machine 90 in similar manner.

The diagram of Figure 16 illustrates movement of the carriage and jaws during the above described operation of removing work pieces from a machine, the work piece P having been transferred to the position P1.

*Operation of the mechanism to feed work pieces into a machine*

With an understanding of the foregoing description it will readily also be understood that operation of the improved mechanism as just described for removing work pieces from a machine may simply be reversed so that work pieces may be supplied to a machine as required. For this purpose the movement of the carriage and jaws, along with the bar 100, may be accomplished as shown in the diagram of Figure 17, the work piece P being transferred to the position P1. The mechanism is readily adaptable to operate in the path of travel there indicated with certain required changes in the arrangement of the electrical contacts and switches. It is believed that such changes are easily within the skill of an experienced electrician and can be made without departing from the scope and spirit of the subjoined claims. Also, with respect to reversing the operation of the mechanism it should be mentioned that the arrangement of the springs 70, 71, 75 and 76 must also be reversed. This may readily be accomplished by detaching the springs from their connection to the lower ends of the levers 51 and 52 and reattaching the springs to the upper ends of the levers, whereby operation of the jaw actuating mechanism is reversed in accordance with the reverse direction of movement of the carriage and associated mechanism.

*Other operations of the mechanism*

Referring to the diagram of Figure 18 it will be observed that the mechanism may be arranged so that vertical movement of the carriage is omitted, the carriage and jaws simply being shifted from side to side within the frame 2 in a reciprocating manner while the jaws 4 are opened and closed as required. Thus the jaws may engage the work piece as at F and transfer the piece directly to the position F1, the jaws opening as required to disengage the piece. Likewise this operation may be reversed and work piece transferred from the position F1 to the position F.

Referring briefly to Figure 1 the position of the crank pin 19 is adjustable with respect to its axis of rotation about the shaft 19a. The position of the pin 19 is controlled by means of a screw 19b to alter the stroke of the lever 21, and movement of the carriage. The horizontal movement of the carriage may be shortened as indicated by the diagram of Figure 19 and the mechanism employed to inch or intermittently advance a work piece to or from another machine. This is illustrated in Figures 20 and 21 where the jaws 4a may be provided with side extensions J1 and J2 to engage intermittently and advance the strip S to position S1. The jaws, of course, open at the forward position and move back to reengage the strip preparatory to another advancing operation.

As shown in Figure 14 it will be clear that for small work pieces such as the work piece indicated at 110 a single mechanism comprising a carriage 2 and single pair of the jaws 4 may be used. For longer work pieces, however, such as the work piece 111 illustrated in Figure 15, it will be preferable to use a pair of the mechanisms herein indicated, such mechanisms comprising carriages 112 and 113 respectively having jaws 114 and 115.

As indicated in Figure 22 it will also be obvious that the work-piece-transferring mechanism as herein described may be employed on opposite sides of a punch press or the like, one of the mechanisms 116 serving to remove finished work pieces from the machine 117 while another of the mechanisms 118 feeds new work pieces to the press. Upon completion of a work cycle the machine 117 may close a switch 119 to initiate operation of the mechanism 116 to remove a work piece. As the mechanism 116 completes its cycle of operation, a switch 120 is closed which initiates operation of a mechanism 118 to transfer a new work piece to the machine 117. At completion of its work cycle the machine 118 may close a switch 121 to initiate again operation of the machine 117 whereafter the chain of operations may be continued as desired.

It is to be understood that full details of the electrical apparatus and details of the various wiring circuits employed therewith form no part of the present invention as such and that to avoid undue complication of this specification these details have been indicated in a general way only. Various suitable apparatus and various wiring circuits may be employed and are deemed to be readily within the skill of an electrical designer.

Other embodiments

Referring now to Figures 23, 24 and 25 I have illustrated another embodiment of my invention. In this embodiment I employ fluid means to effect movement of the various parts and in the specific arrangement shown such fluid means are pneumatic. The stationary frame 1, the vertically movable auxiliary frame 2, the horizontally reciprocating carriage 3 and the clamping jaws 4 have all been given reference numerals like those applied in Figure 1. This is also true of the upper rails 101 and the carriage mounted rails 100.

The means for moving the carriage 3 comprises a cylinder 125 having a piston which in turn has a rod 126 connected thereto. The rod 126 is connected to the carriage 3 by means of the member 127. The carriage 3 has side members 128 which carry rollers 129. These rollers engage on either side of rails 130. The rails 130 are carried on the frame members 2a. Proper application of air to the cylinder 125 will cause the carriage 3 to roll along the rails 130.

In the embodiment of Figures 23, 24 and 25 I have also provided a somewhat different relationship between the rails 100 carried by the carriage 3 and the normally upwardly disposed rails 101. In the embodiment of Figure 1 these rails 101 were stationary. In the modification of Figure 23 the rails 101 are vertically reciprocable. This is done so as to cut down the amount of vertical movement which would otherwise have to be given to the auxiliary frame 2. Referring now particularly to Figure 23 and 24 I have provided members 131 which engage the auxiliary frame members 2a. The members 131 are pivotally connected to a link 132. The link 132 has a pivotal connection at its other end with a member 133 fixed to the bar 134. The rails 101 are mounted on a member 135 which is fixed to the bar 134.

The link 132 has a central mounting on a shaft 136 which shaft is supported in bearings 137 mounted on the frame members 138.

A member 139 engages the shaft 136 between the bearing members 137. At its lower end the member 139 engages a pair of arms 140. These arms 140 have a portion which is fastened to the ends of an enlarged pin 141 fixed to the end of a rod 142. The rod 142 is fixed to a piston working in a cylinder 143.

The cylinder 143 is supported in the frame 1 by means of an extension 144 pinned to a bearing 145 mounted on a lug 146 connected to the frame 1. The support members 138 are fixed to the bearing 145 and through a member 147 to a lug 148 also fixed to the frame 1. When air is properly applied within the cylinder 143 and the rod 142 moved to the right as viewed in Figure 23 the frame 2 will be pushed upwardly and the rails 101 pulled downwardly. Thus it will be apparent that such movement of the rod 142 will cause the links 139 to move about the shafts 136 in a counter-clockwise path as viewed in Figure 23. This in turn will cause the links 132 to move in a counterclockwise direction with the result that the member 134 is pulled downwardly and the member 131 pushed upwardly. And since the rails 101 are connected through the member 135 to the member 134 and the frame 2 is connected to the right end of the link 132 through the member 131, it will be apparent that such frame 2 will be moved upwardly and the rails 101 downwardly.

A switch 149, when engaged by the carriage 3 upon completion of its movement to the right as viewed in Figure 23, will actuate the cylinder 143 so that upward movement of the frame 2 does not occur until completion of movement of the carriage 3 towards the station 90. A switch 150 will be engaged by the member 141 when upward movement of the frame 2 is completed and it will be understood that such switch 150 will actuate the cylinder 125 to effect movement of the carriage 3 away from the station 90. For the sake of simplicity detail connections between the switches 149, 150 and their respective cylinders have been omitted; such arrangements are well known in the art.

When the mechanisms have been actuated as just described the positions of the various parts will be as illustrated in Figure 25. In this figure it will be observed that the carriage 3 has completed its movement to the station 90 and the jaws 4 have been actuated, as will be described shortly so that they engage the workpiece P. In addition the cylinder 143 has been actuated so as to raise the frame 2 and lower the bars 101. As this happened the pieces $P_1$ and $P_2$ which originally were supported on the bars 101 have been transferred to the bars 100 carried on the carriage 3. The switch 150 having just been engaged by the member 141 the carriage 3 will now move away from the station 90.

It will be apparent that after the carriage 3 has moved to its left limit as seen in Figure 25 a second switch, not shown, will be engaged to cause the cylinder 143 to move the rod 142 to the left so as to lower the frame 2 and raise the rails 101. This will result in the workpiece P being placed on the rail 101 in the position of $P_1$ of Figure 23. Similarly the piece $P_1$ of Figures 23 and 25 would then be moved over to the position of $P_2$. In this manner, as before, a series of workpieces may be taken from the station 90 and moved away therefrom in successive steps.

Pneumatic clamping mechanism

In Figures 26 through 29 I have illustrated a clamping mechanism for use in the embodiment of Figures 23 through 25.

Mounted on the carriage 3 is a member 151 to which is fixed a sleeve 152. A cylinder 153 engages the member 151. This cylinder has a piston, not shown, to which is fixed a piston rod 154.

The rod 154 engages a member 155. Fixed to the member 155 is another member 156. Actually the member 156 may shift slightly with respect to the member 155. The member 156 is normally maintained in the position shown in Figure 26 by means of detent means generally indicated at 157.

A sleeve 158 is attached to the member 156. This sleeve carries stops 159 and 160 which are adapted to engage the fixed sleeve 152. Bearing members 161 permit sliding movement of the sleeve 158 within the fixed sleeve 152.

The detent means just referred to are perhaps best seen in Figure 29. Here it will be observed that the member 155 has been provided with a socket 162 and a somewhat enlarged socket 163. The spring 164 and member 157 normally keep the ball 165 engaged within the socket 162 as best seen in Figure 26. Referring again to Figure 29 it will be seen that the member 155 has a depending pin 166 which is located within an orifice 167 provided in the member 156.

The member 155 is provided with a cam surface 168 which engages the rear portion of the gripping member 169. There is a cooperating gripping member 170 to which the member 169 is pivoted as indicated at 171. The spring 172 normally maintains the jaw members 169 and 170 in the position of Figures 26 and 27. The jaw member 170 is fixed while member 169 may move towards and away from it as will now be described.

When the cylinder is actuated and the rod 154 moved to the right as viewed in Figures 26 through 29 such movement will cause the members 155, 156 and 158 to move to the right also. During such movement the member 156 will be positioned with respect to the member 155 so that the detent ball 165 is engaged in the socket 162. The arrangement of parts is such that at about the time the cam surface 168 reaches the rearward portion of the member 169 the stop 160 will engage the fixed sleeve 152. This, of course, prevents further movement of the sleeve 158 towards the right as viewed in these figures.

When movement of the sleeve 158 has been arrested in the manner just described continued movement of the rod 154 will cause the member 155 to move forwardly with respect to the member 156, the detent ball 165 moving from the socket 162 to the socket 163 as perhaps best seen in Figure 29. Such movement of the member 155 will cause the cam surface 168 to pivot the jaw member 169 towards the member 170 thus clamping the workpiece therebetween. Figure 28 shows the position of parts when the workpiece has been gripped.

Referring particularly to Figure 28, which figure shows the position of the parts at the time the workpiece is gripped between the jaw members 169 and 170, it will be observed that the pin 166 engages the right hand wall of the member 155 as defined by the orifice 167. In addition the detent ball 165 rests in about the center of the enlarged socket 163. Upon release of the parts, however, just prior to complete opening of the jaw members 169 and 170, there will be a relaxation of these parts. Thus, when the cylinder 153 is actuated so as to move the piston rod 154 to the left as viewed in Figures 28 and 29, the first thing that happens is that the detent ball 165 engages the right hand wall of the enlarged socket 163 as viewed in Figure 29, the pin 166 at the same time moving out of engagement with the right hand wall of the orifice 167. This is occasioned when the rod 154 has so moved as to bring the stop 159 into engagement with the sleeve 152. Further movement of the rod 154 will cause the member 155 to be shifted with respect to the member 156, the detent ball then moving from the enlarged socket 163 to the small socket 162 thus effecting complete opening of the jaw members 169 and 170 following their initial relaxing as just described. When this final movement of the member 155 with respect to the member 156 occurs it will be apparent that the cam surface 168 moves out of engagement with the rear portion of the jaw member 169 with the result that the spring 172 will then bring these jaw members to their complete open position as shown in Figure 26.

Further modifications

In Figures 30 through 36 I have indicated another important variation possible in my basic apparatus and invention. In this modification I eliminate the clamping means 4 which were associated with the bars 100 in the modifications of Figures 1 and 23. Instead of these clamping members 4 I simply extend the bars 100 and arrange them so that they form a part of the die or other operation performed at the work station 90.

In Figure 33 I have shown the work station 90 as comprising a lower die member 173 which cooperates with an upper die member 174 to trim a piece of work W so as to transform it to the finished product $W_1$.

As best seen in Figures 31 and 32 this lower die member 173 is cylindrical for purposes of illustration only. This die member 173 is slotted at 175 to receive the bars 100. The arrangement is such that the bars 100 may move back and forth through these slots 175 in the die member 173.

Fixed to the bars 100 are die members 176 which, when the bars 100 are in position as shown in Figure 31, completely fill the slots 175 so as to present a uniform die surface to cooperate with the upper die member 174. It will be understood that the die parts 176 carried on the bars 100 are of the same hardened material as the die member 173 itself. In fact it may well be possible to make use of the parts cut from the member 173 to form the slots 175 by attaching them to the bars 100 as at 176.

Referring now to Figure 33 the position of the parts is shown as would occur immediately following actuation and withdrawal of the upper die member 174. As here shown there will be a piece of work W resting on the stationary bars 101. The part $W_1$ just formed by actuation of the upper die member 174 is indicated as resting on the die parts 176 affixed to the bars 100 as above described. Such part $W_1$ is also supported, of course, by the upper portions of the lower die part 173. A part $W_2$ formed by a previous operation is at rest on the right hand stationary bar 101.

The mechanism is so arranged that the frame 2, not shown in these figures, will first rise to such an extent that the bars 100 will go above the stationary bars 101. This results in the workpiece W being transferred from the bar 101 to the bar 100. At the same time the part $W_2$ will be transferred from its bar 101 to the bar 100 as indicated at 100a. This position of the parts is shown in Figure 34. At this time the part $W_1$ will rest solely on the upper ends of the die parts 176.

The apparatus is next actuated so that the carriage 3 travels to the right as viewed in Figure 35. In this manner the workpiece W is brought beneath the upper die member 174 and the parts $W_1$ and $W_2$ are moved further to the right as viewed in these figures. Following movement of the carriage 3 to the right as just described, the frame 2 will then be lowered. This results in the bars 100 being received within the slots 175 provided in the lower die member 173. At this point the work W will rest on the upper portion of the lower die member 173 but the die parts 176 will not then register within the slots 175. As shown in Figure 36 the part $W_1$ and part $W_2$ will both be resting on the bar 101 while the die parts 176 will be positioned beneath the part $W_1$.

Further actuation of the machine will cause the carriage 3 to move to the left as viewed in Fig. 36. This will bring the die parts 176 into proper position within the slots 175 of the lower die part 173. The mechanism will now be in condition for further actuation of the upper die part 174 which will result in transforming the work W into a part such as indicated at $W_1$ and $W_2$.

The cycle above described will then be repeated, it being understood that another workpiece W will have been brought to rest on the left-hand bar 101 in the area 101a. Briefly then, upward movement of the carriage 3 will result in the part formed from the workpiece W being raised from the lower die part 173. Movement of the carriage to the right will transfer this piece to the position of the part $W_1$ and at the same time bring another workpiece W into position beneath the upper die part. Then as the carriage 3 is lowered the part will rest on the lower die member following which the carriage 3 will again move to the left so as to bring the die parts 176 to register within the slots 175. Actuation of the upper die member 174 will again form another part from the work W.

I have diagrammatically illustrated a switch 177 adapted to be engaged by a member 178 carried on the bar 100. It will be understood by those skilled in the art that such arrangement will trip the various mechanisms as desired.

I have also provided means to insure proper positioning of the die parts 176 on the bar 100 within the lower die member 173. To this end the bar 100 is provided with a notch 179 and a spring biased plunger 180 is affixed to the lower die member 173. An adjustable member 181 is also carried on the bar 100 and this is adapted to move between the lower die member 173 and a support 182 for the stationary bar 101. In operation the adjustable member 181 will contact the die member 173 thus bringing the parts 176 into approximate position within the slots 175. The plunger 180 insures that the die parts 176 are properly centered. This might not be possible with only the screw member 181.

It is to be understood that, to further avoid undue complication of the drawings and undue prolixity of this specification, certain of the drawings have been presented in semi-diagrammatic form in order to present the inventive concept in a manner easily understood by those skilled in the art. Obviously various refinements and modifications of the parts may be made without departing from the scope and spirit of the invention.

Thus, while I have shown my invention as embodied in certain specific structures and arrangement of parts, I do not intend to be limited by such structures and arrangements except in so far as they are specifically set forth in the subjoined claims.

Having thus described my invention, what I claim as new and what I desire to protect by way of United States Letters Patent is:

1. In a device for feeding and taking work pieces to and from a machine, a main frame, an auxiliary frame mounted for vertical movement in said main frame, a carriage mounted for horizontal reciprocation in said auxiliary frame, means to move said auxiliary frame, means to move said carriage, work piece gripping means mounted on said carriage, and means to actuate said gripping means, the means for moving said auxiliary frame comprising a motor driven sprocket mounted in said main frame, a gear driveable by said sprocket, a crankpin carried by said gear, a pitman arm engaging said pin, a pair of levers each of which are pivotally fastened at one end to said main frame and at the other end to said pitman arm, and means supporting said auxiliary frame from said levers.

2. The device of claim 1 including clutch means between said sprocket and said gear.

3. The device of claim 2 in which said clutch means comprises a second gear engaging said first mentioned gear, a spring biased pin having a notch and carried by said second gear, a key normally received in said notch, said sprocket being provided with a socket, and solenoid means to withdraw said key from said notch whereby said pin advances into said socket.

4. The device of claim 3 in which said notch is provided with a cam surface so that upon return of said key by said solenoid means said key and cam surfaced notch will coact to withdraw said pin from said socket.

5. In a device for feeding and taking work pieces to and from a machine, a main frame, an auxiliary frame mounted for vertical movement in said main frame, a carriage mounted for horizontal reciprocation in said auxiliary frame, means to move said auxiliary frame, means to move said carriage, work piece gripping means mounted on said carriage, and means to actuate said gripping means, the means for moving said carriage comprising a motor driven sprocket mounted in said main frame, a third gear drivable by said sprocket, a crank pin carried by said third gear, a rocking lever pivoted to said main frame and slotted to receive said crank pin, an arm pivotally fastened to said rocking lever, a pinion carried by said arm, a lower rack fixed to said auxiliary frame, an upper rack fixed to said carriage, said carriage being slidably mounted on rails fixed in said auxiliary frame, and said pinion engaging said upper and lower racks.

6. The device of claim 5 including clutch means between said sprocket and said third gear.

7. The device of claim 6 in which said clutch means comprises a fourth gear engaging said third gear, a spring biased pin having a notch and carried by said fourth gear, a key normally received in said notch, said sprocket being provided with a second socket, and solenoid means to withdraw said key from said notch whereby said pin advances into said second socket.

8. The device of claim 7 in which said notch is provided with a cam surface so that upon return of said key by said solenoid means said key and cam surfaced notch will coact to withdraw said pin from said second socket.

9. In a device for feeding and taking work pieces to and from a machine, a main frame, an auxiliary frame mounted for vertical movement in said main frame, a carriage mounted for horizontal reciprocation in said auxiliary frame, means to move said auxiliary frame, means to move said carriage, work piece gripping means mounted on said carriage, and means to actuate said gripping means, said gripping means comprising a pair of jaw members, a first link pivotally fastened to one of said jaw members and to a second link, a bracket pivotally fastened to said second link, said bracket being fixed on a tube slidably mounted in said carriage, said jaw members being pivotally fastened together, a third link pivotally fastened to the other of said jaw members and to said first link, and means to advance and retract said tube whereby to close and open said jaw members.

10. The device of claim 9 including a rod slidably mounted in said tube, said one jaw member being fixed to said rod, and means to advance and retract said rod whereby to advance and retract said jaw members.

11. The device of claim 9 in which the means for advancing and retracting said tube to actuate said gripping means comprises a second rod fixed in said auxiliary frame, a member slidable between limit means on said rod, a lever fulcrumed in said carriage and pivotally fastened to a short link which is pivotally fastened to said tube, a pair of springs fastened to said lever and to said slidable member, said springs normally being in equilibrium, said slidable member and said carriage being connected together through said springs and said lever and moving together upon actuation of the carriage moving means, said limit means arresting movement of said slidable member prior to the arrest of said carriage whereby said springs are placed in tension out of equilibrium, a latch pin normally abutting said lever, and means to withdraw said latch pin when said springs are under tension whereby said lever is moved about its fulcrum to actuate the tube and thereby the jaw members.

12. The device of claim 10 in which the means for advancing and retracting said rod to advance and retract said jaw members comprises a second rod fixed in said auxiliary frame, a member slidable between limit means on said second rod, a second lever fulcrumed in said carriage and pivotally connected to a short link which is pivotally connected to said first mentioned rod, a second pair of springs fastened to said second lever and to said slidable member, said second pair of springs normally being in equilibrium, said slidable member and said carriage being connected together through said second pair of springs and said second lever and moving together upon actuation of the carriage moving means, said limit means arresting movement of said slidable member prior to the arrest of said carriage whereby said second pair of springs are placed in tension out of equilibrium, a second latch pin normally abutting said second lever, and means to withdraw said second latch pin when said second pair of springs are under tension whereby said second lever is moved about its fulcrum to actuate said first mentioned rod and thereby the jaw members.

13. In a device for feeding and taking work pieces to and from a machine, a main frame, an auxiliary frame mounted for vertical movement in said main frame, a carriage mounted for horizontal reciprocation in said auxiliary frame, means to move said auxiliary frame, means to move said carriage, work piece gripping means mounted on said carriage and means to actuate said gripping means; a constantly rotating motor driven member mounted in said main frame; a first gear; a second gear; means selected to connect said gears with said driven member; said auxiliary frame moving means comprising a pair of arms fastened to said main frame and to a pitman actuated by said first gear, said auxiliary frame being supported on said arms; said carriage moving means comprising a first rack fixed to said auxiliary frame, a second rack fixed to said carriage, a pinion engaging said racks, and means connecting said second gear and said pinion; said gripping means comprising a pair of jaw members pivotally connected together and to linkage operable by a tube slidably mounted in said carriage, and a first rod slidable in said tube and connected to one of said jaw members; and the means for actuating said gripping means comprising a second rod fixed in said auxiliary frame, a second member slidable on said second rod, a pair of levers fulcrumed in said carriage and connected one to said tube and the other to said first rod, springs connecting said levers to said second member whereby said second member moves with said carriage, abutments engaging said levers, means to arrest movement of said second member prior to arrest of said carriage so that said springs are placed in tension, and means to withdraw said abutments when said springs are in tension whereby said levers are moved about fulcrums to actuate said tube and said first rod thereby to actuate said jaw members.

14. The device of claim 13 including first switch means to actuate said selective means for connecting said second gear to said driven member whereby to move said carriage, second switch means to limit further movement of said carriage, third switch means to actuate said abutment withdrawing means whereby said jaw members move together, fourth switch means to actuate said selective means for connecting said first gear to said driven member whereby to move said auxiliary frame, fifth switch means to limit further movement of said auxiliary frame, sixth switch means to reconnect said second gear to said driven member whereby to move said carriage, seventh switch means to limit further movement of said carriage, eighth switch means to reactuate said abutment withdrawing means to open said jaw members, ninth switch means to reconnect said first gear with said driven member to move said auxiliary frame, tenth switch means to limit further movement of said auxiliary frame, eleventh switch means to reconnect said second gear to said driven member, and twelfth switch means to limit further movement of said carriage, the cycle to be repeated upon further actuation of said first switch means.

15. The device of claim 14 including a first work support member fixed with respect to said main frame and a second work support member carried by said carriage, said first work support member being positioned to receive a work piece upon release of said gripping means, and said second work support member being positioned to remove a work piece from said first support member upon upward movement of said auxiliary frame.

16. In mechanism of the type described, a stationary frame, a vertically moveable frame mounted in said stationary frame, a carriage mounted for horizontal reciprocation in said moveable frame, first support members carried by said carriage, and second support members mounted independently of said carriage, whereby said first support members may move above and below said second support members and longitudinally thereof, clamp members on said first support members, means to actuate said clamp members to engage a work piece, whereafter said piece will move with said first support members, and other means to actuate said clamp members to release said piece for disposition on said second support member.

17. The mechanism of claim 16 in which said first support members are provided with die parts.

18. The mechanism of claim 16 in which means are provided to move said second support members vertically.

19. In work performing apparatus, a die member, a stationary frame, a vertically moveable frame mounted in said stationary frame, a horizontally reciprocable carriage mounted in said moveable frame, first support members carried by said carriage and extending through said die member, die parts on said first support members, and said second support members mounted independently of said first support members, whereby a part on said second support members may first be moved upwardly by said first support members, then laterally towards said die member, and then downwardly on said die member, said first support members then moving through said die member until said die parts register with said die member beneath said part.

20. In apparatus of the type described, a stationary frame, a vertically moveable frame mounted in said stationary frame, a horizontally reciprocable carriage mounted in said moveable frame, means to actuate said moveable frame, means to actuate said carriage, first support members carried by said carriage, second support members mounted independently of said carriage and normally disposed above said first support members, clamp means on said first support members, and means to actuate said clamp means whereby first to engage a work piece when said first support members are in their normal position below said second support members and thereafter to release said work piece when said first support members are above said second support members.

21. The apparatus of claim 20 in which all of said actuating means are pneumatic.

References Cited in the file of this patent

UNITED STATES PATENTS

| 1,848,898 | McFarland | Mar. 8, 1932 |
| 2,576,482 | Rydner | Nov. 27, 1951 |
| 2,622,401 | Drago | Dec. 23, 1952 |

FOREIGN PATENTS

| 511,478 | Belgium | June 14, 1952 |